UNITED STATES PATENT OFFICE.

OTTO ZIMMERMANN, OF LUDWIGSHAFEN-ON-THE-RHINE, GERMANY.

PROCEDURE FOR BLEACHING AND STERILIZING CORN AND ITS PRODUCTS.

No. 853,940.

Specification of Letters Patent.

Patented May 14, 1907.

Application filed December 18, 1905. Serial No. 292,302.

*To all whom it may concern:*

Be it known that I, OTTO ZIMMERMANN, of Ludwigshafen-on-the-Rhine, Germany, a subject of the German Emperor, have invented certain new and useful Improvements in Procedures for Bleaching and Sterilizing Corn and its Products, of which the following is a specification.

The bleaching and sterilizing of cereal and its products by means of sulfurous acid gas is well known—as also the use of sulfurous acid salts for this purpose. This procedure however, especially when used with wheat and rye, the most important grains for consumption, has been found to possess the drawback that flour prepared from cereal so treated is quite incapable of being baked, which is due to the injurious effect of the sulfurous acid on the actual body which renders baking possible, an adhesive substance contained in cereal. This fault can be avoided according to the procedure here recommended if one uses a salt of hydrosulfurous acid as for instance $Na_2S_2O_4$ or $NaHS_2O_4$, which is generally produced by the reducing action of zinc on a solution of bisulfite of sodium, or a solution of bisulfite to which sulfurous acid is supplied, and which is applied in a solution of 1-5% according to the quality and color of the cereal which is to be treated. This bleaching solution is applied in the usual manner or any other suitable way for washing cereal. An application of only a few minutes is ample, it is also sufficient to moisten the cereal throughout with the bleaching solution and then leave it open to the after effects for a few hours in the drying silo.

When the quality of the cereal will permit it is well to rinse the bleached cereal in pure water. In contrast to the above mentioned application of sulfurous acids or salt, this procedure has above all the immense advantage that the cereal can at once be further worked up—and it can be used with all kinds of grain without producing any injurious effect on the adhesive substance: *i. e.* without affecting its baking powers; apart from the fact that thin solutions only need to be applied for a short time.

I claim,

A process of bleaching and sterilizing corn and its products consisting in treating the material with a dilute aqueous solution of hydro-sulfite.

OTTO ZIMMERMANN.

Witnesses:
    GEORG SIEBERS,
    VALENTIN MÜLLER.